United States Patent [19]

Ezzell

[11] 4,182,849

[45] Jan. 8, 1980

[54] COPOLYMERS MADE FROM DIVINYL AROMATIC COMPOUNDS AND ALKYLENE POLYAMINES

[75] Inventor: Bobby R. Ezzell, Lake Jackson, Tex.

[73] Assignee: The Dow Chemical Company, Midland, Mich.

[21] Appl. No.: 917,047

[22] Filed: Jun. 19, 1978

[51] Int. Cl.$^2$ .................... C08F 12/34; C08F 12/36
[52] U.S. Cl. .................... 528/392; 252/117; 260/570.5 P; 260/570.8 R; 424/329; 424/330
[58] Field of Search ............... 528/392; 260/570.5
[56] References Cited

U.S. PATENT DOCUMENTS

| | | | |
|---|---|---|---|
| 3,037,970 | 6/1962 | Geiser | 528/392 |
| 3,159,632 | 12/1964 | Sargent | 260/582 X |
| 3,376,344 | 4/1968 | Lane et al. | 260/570.5 |

*Primary Examiner*—Robert V. Hines
*Attorney, Agent, or Firm*—A. C. Ancona

[57] ABSTRACT

New copolymers have been made by reacting a divinyl aromatic compound, e.g., divinyl benzene, with primary or secondary amines, e.g., alkylene diamines or aromatic amines in the presence of a non-hydroxyl strong base, e.g., sodium amide. The reaction may be conducted neat or in an aprotic solvent such as tetrahydrofuran at ambient temperature.

The copolymers may be quaternized with alkyl and aralkyl chlorides to give products which are useful algaecides and bactericides. The copolymers themselves can be used in detergents since they have surfactant properties.

15 Claims, No Drawings

COPOLYMERS MADE FROM DIVINYL AROMATIC COMPOUNDS AND ALKYLENE POLYAMINES

BACKGROUND

The art has taught the condensation reaction of vinyl aromatic compounds with polyamines in which at least two equivalents of amine group are reacted for each equivalent of vinyl group. The catalyst employed is a strongly basic catalyst and the reaction is carried out in an inert nonpolar solvent.

This is taught in particular in U.S. Pat. No. 3,376,344 where vinyl aromatic compounds such as styrene, vinyltoluene, vinylbenzene, and vinylnaphthalene are condensed with alkylenediaminess such as ethylenediamine, triethylenetetramine and other polyalkylenepolyamines containing up to 10-carbon alkylene groups. The catalysts taught as useful are lithium, sodium, potassium, their amides, hydrides, alcoholates, and alkyls, e.g., sodium amide, and butyllithium. Benzene, toluene, tetrahydrofuran and ethylene glycol dimethylether are suggested as solvents. Reaction times up to about 3 hours at temperatures of $-30°$ to about $100°$ C., preferably $10°$ to $30°$ C., are employed.

The products made in U.S. Pat. No. 3,376,344 using at least two, preferably five, equivalents of amine per equivalent of vinyl group are condensation products having the following formula:

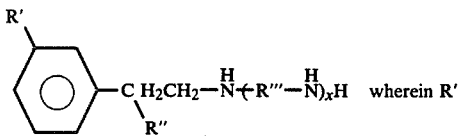

is hydrogen, $C_1-C_{20}$ alkyl, vinyl, $-NH_2$, $-NH(C_1-C_{10}alkyl)$; R" is hydrogen or $C_1-C_{10}$ alkyl, and R''' is $C_1-C_{10}$ alkylene or polyoxyethylene and x is 1-20.

If in the above formula R' is vinyl, i.e., the aromatic vinyl compound is divinylbenzene, the reaction with a polyethylene polyamine, wherein at least two equivalents of amine per vinyl group are employed, a compound having the following structure is produced:

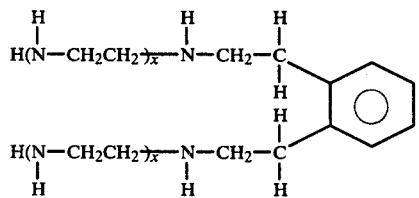

The present invention, instead of making a relatively simple condensation product, employs ratios of 1:1 or less primary amine group to vinyl group which produces an alternating copolymer.

BRIEF DESCRIPTION OF THE INVENTION

The copolymers of the present invention are prepared by reacting a polyalkylenepolyamine or other diprimary amine with a divinyl aromatic compound in the presence of a non-hydroxyl strong base at a ratio of about 0.25:1 to about 1:1 of primary amine group: vinyl group. The preferred ratio is from about 0.5:1 to about 1:1. The reaction is conveniently conducted in a solvent, e.g., tetrahydrofuran, at ambient temperature.

The amine reactant must contain at least two active hydrogens attached to nitrogen atoms. These may be on the same or different nitrogen atoms, but at least two are required for the copolymer to form.

The copolymers formed contain alternating polyalkyleneamine chains and aromatic nuclei connected through the primary nitrogens of the amine and the vinyl groups on the aromatic nuclei. Additionally and alternatively the aromatic nuclei can be connected through a secondary nitrogen of a polyalkylenepolyamine such as diethylenetriamine (DETA) or higher such polymers.

The reaction according to the present invention of an amine with a divinyl aromatic compound in the above ratios is shown in the reaction of

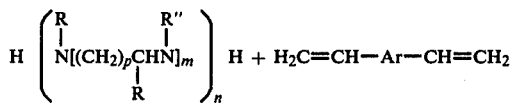

to form the copolymer having the following formula:

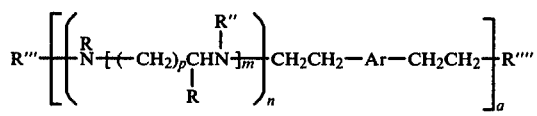

wherein m is 0-1, n is 1-6, p is 0-4; R is hydrogen, methyl, ethyl or propyl; R' and R", which may be the same or different, are hydrogen, phenyl, benzyl, phenethyl, $-CH_2CH_2-Ar-C_2H_5$, $+CH_2)_xCH_3$, or $+CH_2)_yN[(CH_2)_zCH_3]_2$ wherein x is 0-21, y is 2-6 and z is 0-4; R''' is hydrogen, $-CH_2CH_2-Ar-C_2H_5$ or $-CH_2CH_2-Ar-CH=CH_2$; R'''' is hydrogen,

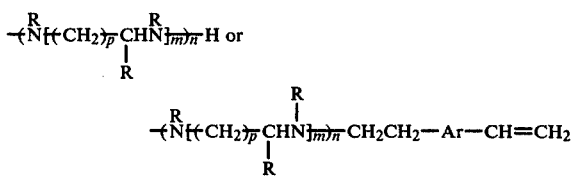

wherein R, R', R", m, n, p, x, y, and z have the aforesaid meaning and wherein Ar is an aromatic-derived radical and a is 4-50.

Alternatively, aromatic primary amines can be employed as the amine source, e.g., aniline, naphthylamine, and the like.

The copolymers so formed can be quaternized by methods well known in the art using alkyl and aralkyl halides; methyl chloride and benzyl chloride are preferred.

Some of the products disclosed in the present application previously have been taught to be useful components of inhibitor compositions used in gas scrubbing systems. These were disclosed in the specification of the patent application of S. Holoman, et al, Ser. No. 736,918, filed Oct. 29, 1976, to the same assignee as the present invention, now U.S. Pat. No. 4,096,085.

Specifically, a polymer of divinylbenzene and triethylenetetramine and one obtained from a divinylbenzene ethylvinylbenzene mixture reacted with diethylenetriamine were employed as inhibitors in the process of scrubbing gases.

DETAILED DESCRIPTION OF THE INVENTION

The present invention reacts primary and secondary alkyl and aryl amines and diamines together with divinyl aromatic compounds to form copolymers. The reaction is usually conducted in an aprotic solvent although a solvent is not necessary. The catalyst is a strong base, but not of the hydroxyl type.

Primary alkyl amines useful in the reaction are methyl, ethyl, propyl, and butyl amines and diprimary amines such as tetramethylene and hexamethylenediamine. Polyalkylenepolyamines which can be employed are ethylenediamine, diethylenetriamine, triethylenetetramine, tetraethylenepentamine, propylenediamine, dipropylenetriamine, and the like analogous polypropylenepolyamines. Di-secondary amines such as N, N'-dialkylpolyalkylenepolamines and N,N'-dialkylpolymethylenediamines, for example N,N' dimethylethylenediamine and N,N' diethyltetramethylenediamines can be employed.

Aromatic amines also may be employed, for example aniline, phenethylamine, naphthylamine, and the like and also aralkylamines such as benzylamine, as well as aromatic diamines, such as phenylenediamines, naphthalenediamines, and the like.

Divinyl compounds useful to form the copolymers are divinyl benzene, divinyl toluene, divinyl naphthalene, divinyl anthracene and the like.

Catalysts useful in the reaction are lithium, sodium, potassium, their amides, hydrides and alkyls such as, for example, sodium amide, lithium hydride, and butyllithium; also sodium biphenyl and sodium naphthalene are useful. The catalyst is employed in an effective amount, preferably from about 0.01 to about 0.2 equivalents based on the vinyl equivalent weight, but this is not critical.

The solvent, when employed, is an aprotic solvent such as tetrahydrofuran. Other solvents useful for conducting the reactants are inert aprotic solvents such as benzene, toluene, ethylene glycol dimethyl ether, and other liquid saturated aliphatic hydrocarbons.

The ratio of reactants in the present process is from about 0.25 to 1 primary amine group to each vinyl group in the case of mono and di primary amines, including alkyl-, aralkyl monoprimary amines and alkylenediamines, e.g. polymethylenediamines and polyalkylene polyamines. In the case of di-secondary amines the ratio is 0.25 to 1 nitrogen equivalent to each vinyl group.

The following experiments illustrate the invention:

POLYMER PREPARATION

EXAMPLE 1 a. Into a one-liter flask, equipped with a stirrer, brine condenser, thermometer, addition funnel and $N_2$ inlet, were introduced 103g (1 mol) of diethylenetriamine (DETA), 300 ml of tetrahydrofuran (THF) and 4 g (0.1 mol) of sodium amide. The mixture was heated at 45° C. for one hour, then cooled to 30° C. at which time 175 g of a mixture of divinylbenzene (DVB) and ethylvinylbenzene (EVB)* was added dropwise over a period of one hour, the temperature being maintained at 35-40° C. A deep violet color developed in the solution. After the addition the solution was heated at reflux (66° C.) for 30 minutes, then cooled and 125 ml water added slowly. This decomposed any catalyst remaining and was followed by addition of 125 ml of 50% caustic (NaOH). The top layer (organic) was separated and the solvent stripped from it, using a Rinco Apparatus at a temperature of 95° C. under 0.5 mm Hg pressure. The product was a dark, viscous, pourable liquid. Vapor chromatography analysis showed no DETA, trace each of diethylbenzene and EVB.

* Mixture contained 55% DVB.

b. In another experiment the same components of the above experiment were used, but after adding the DETA, THF and sodium amide no heat was applied. A portion (25%) of the DVB-EVB mixture was added without heating but with vigorous stirring. The violet color developed as the reaction exothermed to about 40° C. The temperature was lowered by cooling in an ice bath to 25° C. The remaining DVB-EVB mixture was added with stirring while the temperature was controlled at 25°-30° C. After addition was completed (1 hr.) the mixture was stirred for 30 minutes at room temperature. HCl (0.1 mol) in 25 ml of water was added dropwise. After standing about 40 hours the solution was stripped of solvent as before.

EXAMPLE 2

Two experiments (A & B) were run to determine the effect of temperature on the product polymer. In each run 103 g (1.0 mol) of DETA, 250 ml THF, 1.5 g $NaNH_2$ catalyst and 174 g DVB-EVB mixture were employed.

In Run A the reaction mixture, containing 30% of the DVB-EVB, was heated to 40°-45° C. at which time it exothermed to 60°-65° C. Remainder of olefin was added at a rate to maintain a 60° C. temperature. After addition was completed, a temperature of 60° C. was maintained for two hours.

In Run B the reaction mixture was not allowed to exceed 35° C. during addition of olefin, most of addition took place at 30° C. When addition was complete, mixture was left to stand at room temperature (25° C.) for one hour, then was heated an additional hour at 35°-40° C. Finally, it was heated another hour at 65°-70° C. Vapor phase chromatogrpahy indicated no change in reaction composition subsequent to the initial hour of standing at room temperature following the completion of addition of all reactants.

The molecular weights determined from a plot of relative viscosity vs molecular weight showed Examples 2A and 2B to be 1370 and 1630, respectively.

EXAMPLE 3

In the manner of Example 2B above, DETA (92.7, 0.9 mol) was reacted in 250 ml THF in the presence of $NaNH_2$ (1.5 g) with the same DVB-EVB mixture (174 g, 2 moles olefinic unsaturation) as in Example B and under same reaction conditions, i.e., low temperature. The molecular weight of the polymer obtained was about 2800 for an amine to olefin ratio of 0.9/1 as compared to the molecular weight of 1630 for the 1/1 ratio of Example 2B.

EXAMPLE 4

The polymers of Examples 2A and 2B were reacted with aqueous HCl to obtain the amine hydrochloride. The solutions remained viscous and the viscosities were essentially the same as for the free polymer.

The above examples show that the catalyst level has little or no effect except that the minimum may be limited by the moisture content of the reactants The reaction temperature has a definite effect on the viscosity of the polymer formed, with lower temperatures forming more viscous, higher molecular weight polymers. The molecular weight varies inversely with the amine/olefin ratio.

QUATERNIZATION OF POLYMER

EXAMPLE 5

Another polymer, prepared as in Example 2B, but using 8X the quantities of reactants, was dissolved in 2-propanol (100 g in 192 ml) and to this was added about 50 ml of methylchloride. The solution was heated in an autoclave at 90° C. for 10 hours and then cooled and 188 ml water was added to it and it was stirred to dissolve the solid. Excess methyl chloride was removed by employing vacuum at room temperature. The resulting solution contained 30% solids. Surface tension was measured on a 0.1% aqueous solution and found to be 58.5 dynes/cm.

The above solution, weighing 468 g and containing 30% solids, was neutralized with 50.6 g of 50% NaOH which gave a solution containing 22.5% active solids. Surface tension measured on a 0.1% solution of this material was 36 dynes/cm.

POLYMERS PREPARED FROM AROMATIC AMINES

EXAMPLE 6 a. In a manner similar to Example 2A a mixture of 88.5 g DVB-EVB (73.5% DVB, 24.1% EVB, 0.5 DEB*) was reacted with 46.5 g aniline in 150 ml THF containing 1.5 g NaNH$_2$, which amounted to a 0.5:1 equivalent ratio of primary amine to olefin (based on DVB alone, excluding EVB). The aniline was added to the olefin mixture containing catalyst which had been heated to 40° C. Initially 10 ml was added and the remainder added slowly after the temperature had been raised to 60° C. and maintained there during the addition. After the addition was completed, the temperature was raised to reflux and maintained for a period of about 20–24 hours.
* DEB=diethylbenzene.

b. The same reaction was run as in (a) except substituting benzylamine (53.5 g) for aniline and reacting with 87 g of the olefin mixture**.
** The DVB-EVB mixture contained 55% DVB as in Example 1 above and the ratio was based on total vinyl groups in the mixture, not on DVB alone.

The following polymers were prepared by: reacting various amines with the DVB-EVB mixture** used heretofore and then quaternized with benzyl or methyl chloride. The table shows the amine used, the ratio of amine to olefin, i.e., primary amine to olefinic double bond, the chloro compound and the percent solids in the resulting solution.
** The DVB-EVB mixture contained 55% DVB as in Example 1 above and the ratio was based on total vinyl groups in the mixture, not on DVB alone.

| Example | Amine | Ratio NH$_2$/C=C | RCl* | % Solids |
|---|---|---|---|---|
| 7 | DETA | 1/1 | Bz | 49.7 |
| 8 | DETA | 0.9/1 | Bz | 50 |
| 9 | DETA | 1/1 | Me | 50 |
| 10 | DETA | 1/1 | cT | 49.9 |
| 11 | EDA | 1/1 | Bz | 50 |
| 12 | TETA | 1/1 | Bz | 48.6 |

-continued

| Example | Amine | Ratio NH$_2$/C=C | RCl* | % Solids |
|---|---|---|---|---|
| 13 | Bz | 1/2 | Bz | 50 |

*Abbreviations for chloro compound are: Bz = benzyl, Me = methyl, cT = cis-Telone (cis-isomer of 1,3-dichloropropene).

The above 100% quaternized ** copolymers of EDA, DETA and TETA (Ex. 7–12) possess activity against E. Coli, obtaining 99.999% reduction of the organism at 25 ppm of the quaternized copolymer.
** All nitrogens reacted with chloro compound.

EXAMPLE 14 a. In the manner of Example 1b, the same reaction, employing the same ratios of reactants, but half the amounts, was performed. After all the DVB-EVB mixture had been added to the DETA and the reactants were allowed to stand a half-hour at room temperature, 104 g (1 vinyl equivalent) of styrene was added all at once and the temperature held at 30° C. for one hour. The ratio of NH$_2$/vinyl groups in DVB-EVB/vinyl groups in styrene was 1/1/1. The temperature was raised to reflux for 3 hours, which reacted essentially all of the EVB and styrene. The mixture was cooled to 60° C. and allowed to stand overnight. After cooling to room temperature the catalyst was destroyed by adding 5 ml conc. HCl The solvent and any excess EVB and styrene were stripped off by heating under vacuum.

b. In the same manner another polymer was made in which the ratio was 1/1/0.5, i.e., half the amount of styrene was used as before.

Both polymers (a & b) were quaternized with methyl chloride to about 80%, i.e., 80% of the nitrogens were reacted with methyl chloride. These quaternized copolymers were found to be as effective against E. Coli as those of Examples 7–12.

The compounds of Examples 14a and b also showed activity against Anabaena flos-aquae of between 80–90% at concentrations 1.6 ppm of the active compound.

I claim:

1. New copolymers of amines and divinyl aromatic compounds having the formula:

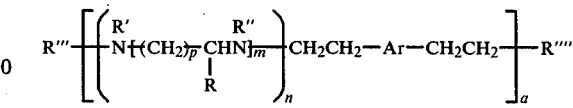

wherein m is 0–1, n is 1–6, p is 0–4; R is hydrogen, methyl, ethyl or propyl; R' and R", which may be the same or different, are hydrogen, phenyl, benzyl, phenethyl, —CH$_2$CH$_2$—Ar—C$_2$H$_5$, —(CH$_2$)$_x$CH$_3$, or —(CH$_2$)$_y$N[(CH$_2$)$_z$CH$_3$]$_2$ wherein x is 0–21, y is 2–6 and z is 0–4; R''' is hydrogen, —CH$_2$CH$_2$—Ar—C$_2$H$_5$ or —CH$_2$CH$_2$—Ar—CH=CH$_2$; R''' is hydrogen,

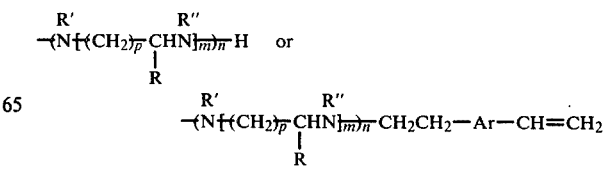

wherein R, R', R'', m, n, p, x, y, and z have the aforesaid meaning and wherein Ar is an aromatic-derived radical and a is 4-50.

2. A process for making copolymers of amines and divinyl aromatic compounds which comprises reacting an amine having at least two active hydrogens attached to nitrogens with a divinyl aromatic compound in the presence of a non-hydroxyl base wherein the ratio of amine to vinyl group is 0.25:1 to 1:1, based on primary amine equivalents in the case of primary amines and on nitrogen equivalents in the case of di-secondary amines.

3. The process of claim 2 wherein the primary amine is a mono-primary amine.

4. The process of claim 3 wherein the primary amine is a diprimary amine.

5. The process of claim 4 wherein the diprimary amine also contains secondary amine groups.

6. The process of claim 2 wherein the amine is a di-secondary amine.

7. The process of claim 3 wherein the primary amine is an akyl or aralkyl amine.

8. The process of claim 3 wherein the primary amine is an aryl amine.

9. The process of claim 4 wherein the diprimary amine is ethylene diamine.

10. The process of claim 4 wherein the diprimary amine is a polymethylene diamine.

11. The process of claim 5 wherein the diprimary amine is a polyalkylene polyamine.

12. The process of claim 11 wherein the divinyl aromatic compound is divinyl benzene.

13. The process of claim 12 wherein the polyalkylenepolyamine is diethylenetriamine or triethylenetetramine.

14. The process of claim 7 wherein the aralkylamine is benzylamine and the divinyl aromatic is divinylbenzene.

15. The process of claim 9 wherein the divinyl aromatic component is divinylbenzene.

* * * * *

UNITED STATES PATENT AND TRADEMARK OFFICE
CERTIFICATE OF CORRECTION

PATENT NO. : 4,182,849
DATED : January 8, 1980
INVENTOR(S) : Bobby R. Ezzell

It is certified that error appears in the above-identified patent and that said Letters Patent are hereby corrected as shown below:

Column 2, line 20, after the first R add --'--.

Column 4, line 44, please correct "chromatogrpahy" to read --chromatography--.

Signed and Sealed this

Thirteenth Day of May 1980

[SEAL]

*Attest:*

SIDNEY A. DIAMOND

*Attesting Officer*     *Commissioner of Patents and Trademarks*